US012502683B2

(12) United States Patent
Zhong

(10) Patent No.: US 12,502,683 B2
(45) Date of Patent: Dec. 23, 2025

(54) LIQUID DISPENSER

(71) Applicant: Shanghai Keto Tech Co., Ltd., Shanghai (CN)

(72) Inventor: Fangqi Zhong, Shanghai (CN)

(73) Assignee: Shanghai Keto Tech Co., Ltd., Shanghai (CN)

( * ) Notice: Subject to any disclaimer, the term of this patent is extended or adjusted under 35 U.S.C. 154(b) by 199 days.

(21) Appl. No.: 18/356,257

(22) Filed: Jul. 21, 2023

(65) Prior Publication Data

US 2023/0356245 A1 Nov. 9, 2023

(51) Int. Cl.
*B05B 11/00* (2023.01)
*B05B 11/10* (2023.01)

(52) U.S. Cl.
CPC ...... *B05B 11/0039* (2018.08); *B05B 11/1001* (2023.01); *B05B 11/1057* (2023.01)

(58) Field of Classification Search
CPC ............ B05B 11/0039; B05B 11/1001; B05B 11/1057; B05B 11/0044; B05B 11/104; B05B 11/1011; B05B 11/1063
See application file for complete search history.

(56) References Cited

U.S. PATENT DOCUMENTS 2,026,234 A * 12/1935 Knuutila ................. B05B 15/30 222/324
4,211,345 A * 7/1980 Taubenmann ...... B01F 35/7174 277/435
2003/0155371 A1 8/2003 Collasius et al.
2012/0187152 A1* 7/2012 Zhou ................... B05B 11/1097 222/372
2014/0319244 A1* 10/2014 Rech ................... B05B 11/0075 239/337
2016/0136665 A1* 5/2016 Rech ................... B05B 11/1064 222/336
2022/0055050 A1 2/2022 Syson et al.
2022/0055052 A1 2/2022 Uehara et al.
2023/0356245 A1* 11/2023 Zhong ................. B05B 11/1011

* cited by examiner

*Primary Examiner* — Bob Zadeh
(74) *Attorney, Agent, or Firm* — Zhigang Ma

(57) ABSTRACT

Disclosed is a liquid dispenser, including a pumping structure and a pressure-accumulation ejecting structure which cooperate for use, wherein the pumping structure includes a main frame, a liquid storage cavity and a piston rod, the liquid storage cavity is built into the main frame, and the lower end of the liquid storage cavity is provided with a liquid inlet and a liquid outlet which can be opened and closed; the piston rod can move upward and downward along the liquid storage cavity under the action of a driving member, when the piston rod moves downward, only the liquid outlet is in an open state, and when the piston rod moves upward, only the liquid inlet is in an open state. The liquid dispenser of the present disclosure is simple to assemble, and the service life of the liquid dispenser is prolonged while improving the stability of assembly of parts.

20 Claims, 13 Drawing Sheets

LIQUID DISPENSER

TECHNICAL FIELD

The present disclosure relates to the technical field of liquid dispensing equipment, and in particular to a liquid dispenser.

BACKGROUND

A liquid dispenser, such as a spray bottle or an ejection bottle, is a device that ejects portions or other liquids as fine particles of water using air suction. The existing liquid dispenser mainly includes a pumping structure, a pressure-accumulation ejecting structure and a liquid storage bottle, the liquid inside the liquid storage bottle is sucked by the pumping structure and fed into the pressure-accumulation ejecting structure, and the liquid is ejected in the form of a mist by pressurizing the liquid by the pressure-accumulation ejecting structure.

The pumping structure typically includes a liquid storage cavity and a piston rod movable within the liquid storage cavity, and when the piston rod moves downward along the liquid storage cavity, the gas or liquid in the liquid storage cavity is pumped into the pressure-accumulation ejecting structure. However, the existing liquid dispenser has a complicated structure design, a large number of parts, and poor stability after assembly, which affects the service life of the liquid dispenser.

SUMMARY

In order to overcome the above disadvantages, an object of the present disclosure is to provide a liquid dispenser which is simple to assemble, and the service life of the liquid dispenser is prolonged while improving the stability of assembly of parts.

In order to achieve the above object, the technical solution adopted by the present disclosure is as follows: a liquid dispenser includes a pumping structure and a pressure-accumulation ejecting structure which cooperate for use, wherein the pumping structure includes a main frame, a liquid storage cavity and a piston rod, wherein the liquid storage cavity is built into the main frame, and a lower end of the liquid storage cavity is provided with a liquid inlet and a liquid outlet which can be opened and closed; the piston rod can move upward and downward along the liquid storage cavity under the action of a driving member, when the piston rod moves downward, only the liquid outlet is in an open state, and when the piston rod moves upward, only the liquid inlet is in an open state;

the main frame is provided with a diversion channel and a guiding portion, the diversion channel is located at one side of the liquid storage cavity, one end of the diversion channel communicates with the pressure-accumulation ejecting structure, and the other end of the diversion channel communicates with the guiding portion; the guiding portion is located below the liquid storage cavity and includes a liquid inlet channel for enabling a liquid storage bottle to communicate with the liquid inlet, and a liquid outlet chamber for enabling the liquid outlet to communicate with the diversion channel.

When the piston rod moves downward, the liquid outlet is opened and the liquid inlet is closed, and at this time, as the volume of the liquid storage cavity becomes smaller and the internal pressure increases, the liquid in the liquid storage cavity can enter the liquid outlet chamber from the liquid outlet and enter the pressure-accumulation ejecting structure via the diversion channel; when the piston rod moves upward, the liquid outlet is closed and the liquid inlet is opened, at this time, since the volume in the liquid storage cavity becomes larger and the internal pressure becomes smaller, the liquid in the liquid storage bottle is sucked into the liquid storage cavity, and at the same time, the liquid entering the pressure-accumulation ejecting structure via the diversion channel is ejected.

The beneficial effects of the present disclosure lie in that:

the liquid inlet and the liquid outlet are arranged at the lower end of the liquid storage cavity, so that the purpose of single-sided liquid inlet and liquid outlet of the liquid storage cavity is achieved; the guiding portion located below the liquid storage cavity is arranged on the main frame, and the liquid inlet channel is arranged on the guiding portion, so that the communication of the liquid storage bottle with the liquid inlet is realized; further, the diversion channel is directly formed on the main frame and cooperates with the liquid outlet chamber on the guiding portion, so that the communication of the liquid outlet with the pressure-accumulation ejecting structure is realized, thereby realizing the liquid outlet function; in addition, during the upward and downward movement of the piston rod, the main frame and the guiding portion are always in a stationary state, thereby avoiding the problem of connection instability due to following of parts; moreover, the guiding portion and the diversion channel are directly used to enable the liquid storage cavity to communicate with the pressure-accumulation ejecting structure, so that the liquid outlet path simplified, the structure of parts is simpler, the difficulty of processing the parts is reduced, and the stability after assembly is high, and the service life is prolonged.

Further, the guiding portion includes a suction pipe and a fixing seat which cooperate for use, wherein the fixing seat is snap-fitted into the main frame, and is provided with the liquid outlet chamber; the suction pipe is arranged at a lower end of the fixing seat, and one end of the suction pipe extends into the liquid storage bottle; the fixing seat is provided with a guiding branch pipe, and two ends of the guiding branch pipe communicate with the suction pipe and the liquid inlet, respectively; the suction pipe and the guiding branch pipe internally together form the liquid inlet channel. Through the arrangement of the guiding branch pipe, the liquid inlet channel can be separated from the liquid outlet chamber, so that the liquid in the liquid inlet channel can directly enter the liquid inlet instead of entering the liquid outlet chamber.

Further, the fixing seat includes a seat body, wherein an upper end of the seat body is provided with the liquid outlet chamber, a lower end of the seat body is provided with an extension pipe capable of sleeving the suction pipe, and an inner bottom wall of the liquid storage cavity is provided with a guiding hole communicating with the extension pipe. During assembly, after the suction pipe is inserted into the extension pipe, the suction pipe can communicate with the guiding hole. The assembling stability of the fixing seat with the suction pipe is guaranteed by the arrangement of the extension pipe.

Further, a mouth at an end of the extension pipe facing the liquid storage bottle is set in a trumpet shape.

Further, an inlet valve is arranged at the liquid inlet, and an outlet valve is arranged at the liquid outlet. The inlet valve and the outlet valve each include an arc-shaped valve which can be opened and closed unidirectionally. The blocking or unblocking of the liquid inlet is realized by the inlet valve, the blocking or unblocking of the liquid outlet is realized by the outlet valve, and the blocking effect of the inlet valve or the outlet valve is further enhanced by the arrangement of the arc-shaped valve.

Further, the driving member includes a trigger and a trigger spring, wherein the trigger includes a casing detachably connected with the piston rod, one end of the casing is pivoted on the main frame, and the other end of the casing is provided with a pressing handle; one end of the trigger spring abuts against the casing, and the other end of the trigger spring abuts against the main frame.

When the pressing handle is pressed downward, the casing can rotate downward around a position where the casing is pivoted with the main frame, thereby driving the piston rod to move downward, at this time, the trigger spring is pressed downward and compressed; when the pressing handle is released, the trigger spring rebounds upward and stretches and drives the casing to rotate upward around a position where the casing is pivoted with the main frame, thereby causing the piston rod to move upward.

Further, the pressure-accumulation ejecting structure includes a top cover, a pressure accumulation cavity and a nozzle, wherein the pressure accumulation cavity is formed on the main frame and is internally provided with a pressure accumulation portion for pressurizing liquid; the top cover is located above the pressure accumulation cavity and is internally provided with a top cover inner cavity capable of communicating with the diversion channel, the pressure accumulation cavity and the nozzle.

Further, the pressure accumulation portion includes an inner plug that is built into the pressure accumulation cavity and divides the pressure accumulation cavity into an upper cavity and a lower cavity, and the upper cavity communicates with the top cover inner cavity; the lower cavity is internally provided with a pressure accumulation spring and an ejector rod, and one end of the pressure accumulation spring abuts against a bottom of the pressure accumulation cavity, and the other end of the pressure accumulation spring abuts against the ejector rod; an upper end part of the ejector rod is sleeved with the inner plug which is in dynamic sealing connection with a side wall of the pressure accumulation cavity.

When the liquid enters the pressure-accumulation ejecting structure from the diversion channel, the liquid can exert pressure on the inner plug, the pressure of the liquid forces the inner plug to move downward, and drives the ejector rod to move downward, and the pressure accumulation spring is compressed; at this time, the top cover inner cavity is opened due to the downward movement of the inner plug, and part of the liquid can enter the nozzle via the top cover inner cavity to be ejected, and part of the liquid floods into the upper cavity with the downward movement of the inner plug; when the liquid outlet is closed, the pressure accumulation spring rebounds, and the liquid in the upper cavity and the top cover inner cavity is ejected from the nozzle under the action of pressure.

Further, a side wall of the top cover inner cavity is provided with a sealing inclined plane, and an upper end of the inner plug is provided with a hemispherical plug that can be hermetically attached to the sealing inclined plane. The top cover is further internally provided with an inner cavity liquid inlet channel and an inner cavity liquid outlet channel located at two sides of the top cover inner cavity; the inner cavity liquid inlet channel is located below the sealing inclined plane so as to enable the diversion channel to communicate with the top cover inner cavity; the inner cavity liquid outlet channel is located above the sealing inclined plane so as to enable the top cover inner cavity to communicate with the nozzle.

The inner cavity liquid inlet channel is arranged below the sealing inclined plane, and the inner cavity liquid outlet channel is arranged above the sealing inclined plane, so that when the hemispherical plug is hermetically attached to the sealing inclined plane, the inner cavity liquid inlet channel and the upper cavity do not communicate with the inner cavity liquid outlet channel, thereby preventing outside gas from entering the upper cavity and the inner cavity liquid inlet channel from the inner cavity liquid outlet channel in a non-use state, thereby preventing the risk that liquid remaining in the upper cavity, the inner cavity liquid inlet channel (and the diversion channel) is oxidized.

Further, the inner cavity liquid inlet channel and the inner cavity liquid outlet channel are both of a linear structure, and the inner cavity liquid inlet channel and the inner cavity liquid outlet channel are arranged in parallel. By setting the inner cavity liquid inlet channel and the inner cavity liquid outlet channel to be of linear structures in parallel, the resistance of the inner cavity liquid inlet channel and the inner cavity liquid outlet channel to the liquid is reduced, and the ejection is more labor-saving.

Further, an inlet of the inner cavity liquid outlet channel is arranged on the side wall of the top cover inner cavity, and the inlet of the inner cavity liquid outlet channel is arranged close to the bottom of the top cover inner cavity, such that liquid in the top cover inner cavity can be discharged as much as possible when the inner plug moves upward toward the bottom of the top cover inner cavity so as to reduce the amount of liquid remaining in the top cover inner cavity.

Further, a side wall of the pressure accumulation cavity is further provided with a pressure relief groove, and the fixing seat is provided with a backflow channel for enabling the pressure relief groove to communicate with the liquid storage bottle; when a lower end part of the inner plug moves to a position below the pressure relief groove, the liquid in the upper cavity can flow back into the liquid storage bottle via the pressure relief groove and the backflow channel. By arranging the pressure relief groove, the liquid in the upper cavity can flow back into the liquid storage bottle via the pressure relief groove and the backflow channel, so that the pressure in the pressure accumulation cavity will not rise after reaching a certain level, and the pressure stabilization effect is achieved.

Further, the pumping structure further includes a pressure relief portion, wherein the pressure relief portion includes an actuating member, a pressure relief valve and a pressure relief channel, the pressure relief valve is arranged on a side of the piston rod facing the liquid storage cavity and can enable the liquid storage cavity to communicate with the pressure relief channel under the action of the actuating member; the actuating member is arranged at a bottom of the liquid storage cavity and can make contact with the pressure relief valve and open the pressure relief valve during downward movement of the piston rod.

During the downward movement of the piston rod, when there is gas in the liquid storage cavity, and the pressure-accumulation ejecting structure is not opened in time, the gas retained between the liquid storage cavity and the pressure-accumulation ejecting structure is in a relatively closed space, there is a problem that the compressed gas may be formed due to the fact that the volume of the liquid storage cavity becomes small, thereby causing the movement of the piston to be hindered, and the gas in the liquid storage cavity is difficult to exhaust; based on this, in the pressure relief portion, the actuating member is arranged at the bottom of the liquid storage cavity, so that during the downward movement of the piston rod, the actuating member can make contact with and open the pressure relief valve, so that the liquid storage cavity can communicate with the pressure relief channel, and the compressed gas in the liquid storage cavity can be discharged by means of the pressure relief channel, thereby ensuring the pumping efficiency of the piston rod.

Further, the pressure relief valve includes a valve body, wherein an outer peripheral face of the valve body is provided with a sealing lip capable of hermetically abutting against the piston rod, and a lower end of the valve body is provided with an abutment convex ring with which the actuating member can make contact. By the arrangement of the sealing lip on the outer peripheral face of the valve body, the annular sealing of the pressure relief valve for the piston rod is ensured, in addition, since the pressure relief valve is arranged on the side of the piston rod facing the liquid storage cavity, when the pressure relief valve is not opened (that is, the sealing lip hermetically abuts against the inner side wall of the piston rod), a seal for the top of the liquid storage cavity can be jointly formed by the pressure relief valve and the piston rod.

Further, the piston rod is provided with a pressure relief hole located above the sealing lip, the pressure relief channel is built into the main frame, and two ends of the pressure relief channel communicate with the pressure relief hole and the liquid storage bottle, respectively. Communication of the interior of the piston rod with the pressure relief channel is realized by the arrangement of the pressure relief hole so as to facilitate discharging of the compressed gas in the liquid storage cavity into the pressure relief channel through the pressure relief hole when the pressure relief valve is opened (the sealing lip does not abut against the piston rod) to release the compressed gas into atmospheric pressure gas.

Further, the actuating member includes an annular boss, wherein a lower end of the annular boss is fixedly connected in the liquid storage cavity, and an upper end of the annular boss faces the abutment convex ring; when the piston rod moves downward, the abutment convex ring can abut against the annular boss, so that the sealing lip is tilted upward to not hermetically abut against the piston rod.

The abutting convex ring abuts against an annular face of the annular boss, such that when the piston rod continues to drive the valve body to move downward, the valve body can generate arch-shaped deformation, so that the sealing lip and the piston rod form a gap therebetween and are no longer in hermetical abutment, and at this time, the compressed gas in the liquid storage cavity can enter the pressure relief hole along the gap between the sealing lip and the piston rod.

Further, the abutment convex ring of a ring-like structure, and a side of the abutment convex ring facing the sealing lip is a first inclined plane inclined downward in a direction from a position close to the sealing lip to a position away from the sealing lip; the annular boss is provided with a second inclined plane abutting against the first inclined plane. During the downward movement of the piston rod, the movement of the abutment convex ring is guided by the abutment of the first inclined plane against the second inclined plane.

Further, an upper end of the valve body is provided with a connecting rod inserted into the rod body by interference fit to achieve fixed connection of the pressure relief valve to the piston rod.

Further, the piston rod includes a rod body, wherein a lower end of the rod body is provided with a piston which is in dynamic sealing connection with the liquid storage cavity, the piston is provided with a piston accommodating groove facing a bottom of the liquid storage cavity. The pressure relief valve is located in the accommodating groove and divides the accommodating groove into an upper accommodating groove and a lower accommodating groove, and the upper accommodating groove communicates with the pressure relief hole. Wherein the upper accommodating groove directly communicates with the pressure relief hole and the pressure relief channel, and the interior of the upper accommodating groove is in an atmospheric pressure state; the lower accommodating groove communicates with the liquid storage cavity, and the interior of the lower accommodating groove maintains the same air pressure state as the liquid storage cavity.

Further, when the piston rod moves downward, the junction between the valve body and the sealing lip can abut against the inner wall of the upper accommodating groove.

1—main frame; 11—liquid storage cavity; 111—liquid inlet; 112—liquid outlet; 12—diversion channel; 13—inlet valve; 14—outlet valve; 15—arc-shaped valve; 16—pressure stabilizing channel;

2—piston rod; 21—rod body; 22—piston; 221—piston accommodating groove;

3—liquid outlet chamber;

41—suction pipe; 42—fixing seat; 421—seat body; 422—extension pipe; 423—backflow channel; 43—guiding branch pipe;

51—trigger; 511—pressing handle; 52—trigger spring;

61—top cover; 611—top cover body; 612—cover shell; 613—inner cavity liquid inlet channel; 614—inner cavity liquid outlet channel; 615—sealing inclined plane; 621—upper cavity; 622—lower cavity; 63—nozzle; 64—inner plug; 641—hemispherical plug; 65—pressure accumulation spring; 66—ejector rod; 67—pressure relief groove;

71—pressure relief valve; 711—valve body; 712—sealing lip; 7121—annular piece; 7122—annular protrusion; 713—abutment convex ring; 7131—first inclined plane; 714—connecting rod; 72—pressure relief channel; 73—pressure relief hole; 74—annular boss;

8—top cap;

9—housing.

DETAILED DESCRIPTION

The preferred embodiments of the present disclosure will be described in detail below with reference to the accompanying drawings, so that the advantages and features of the present disclosure can be more readily understood by those skilled in the art, and the scope of the present disclosure can be more clearly defined.

Embodiment

Figure 1:
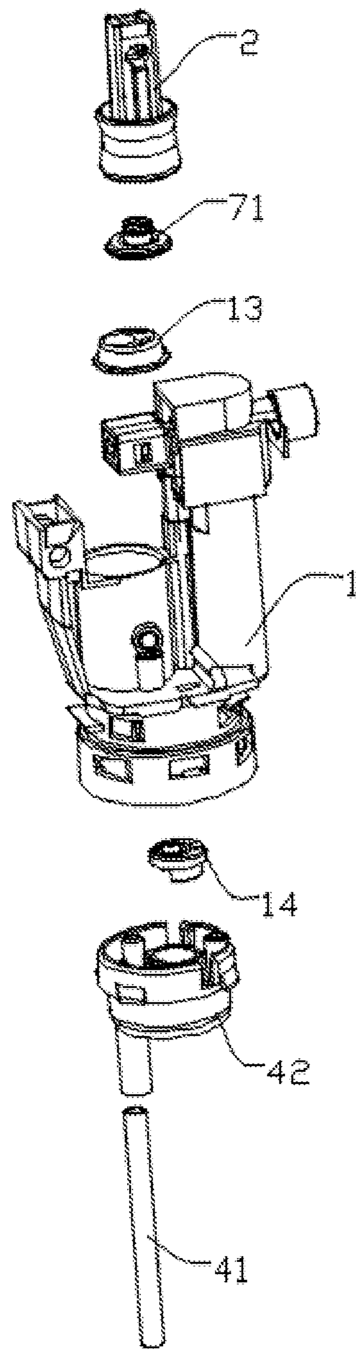
FIG. 1 is an exploded view of a pumping structure of a liquid dispenser according to an embodiment of the present disclosure.
Figure 2:
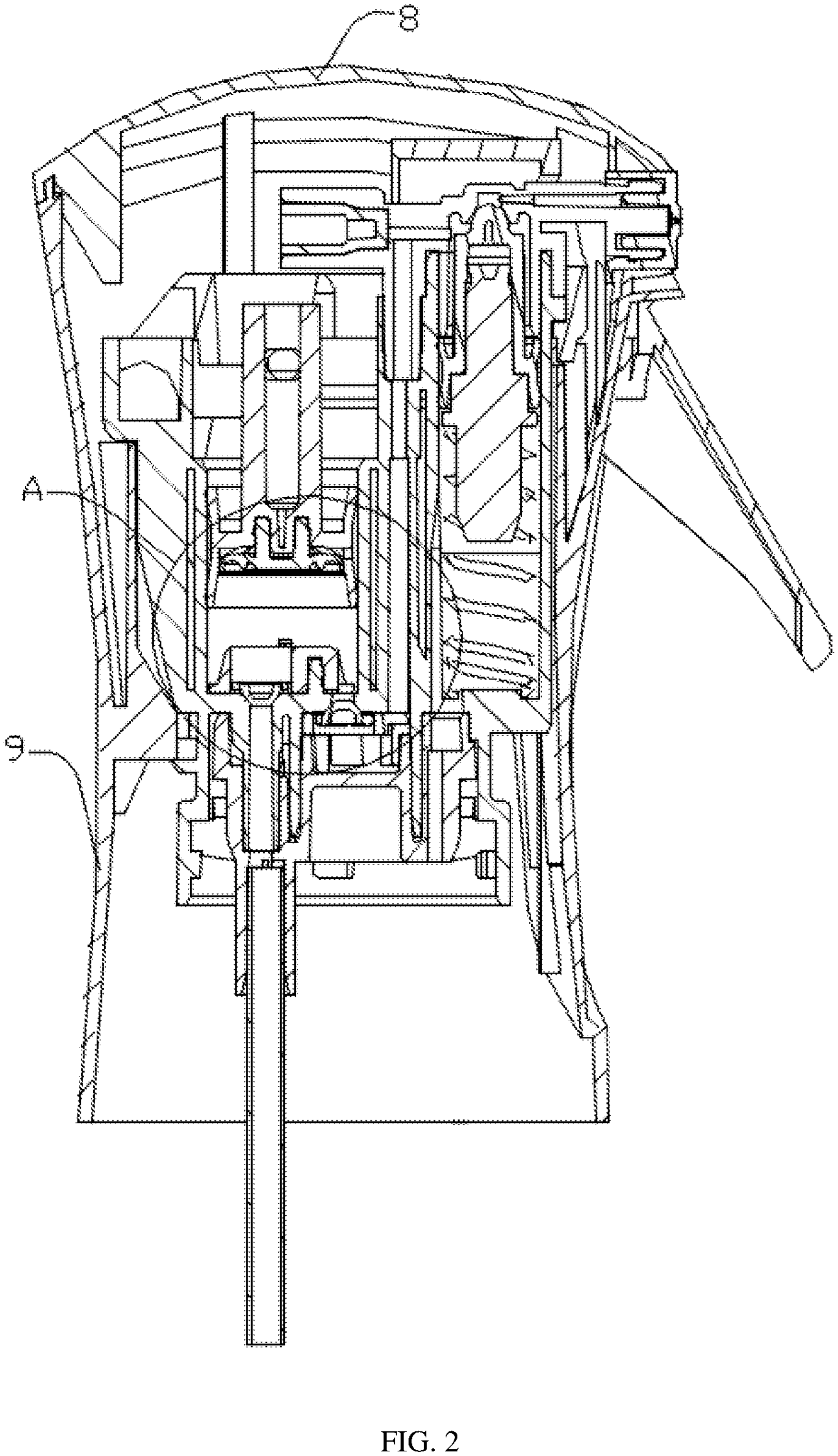
FIG. 2 is a schematic cross-sectional view of a liquid dispenser according to an embodiment of the present disclosure when a trigger is not pressed.
Figure 3:
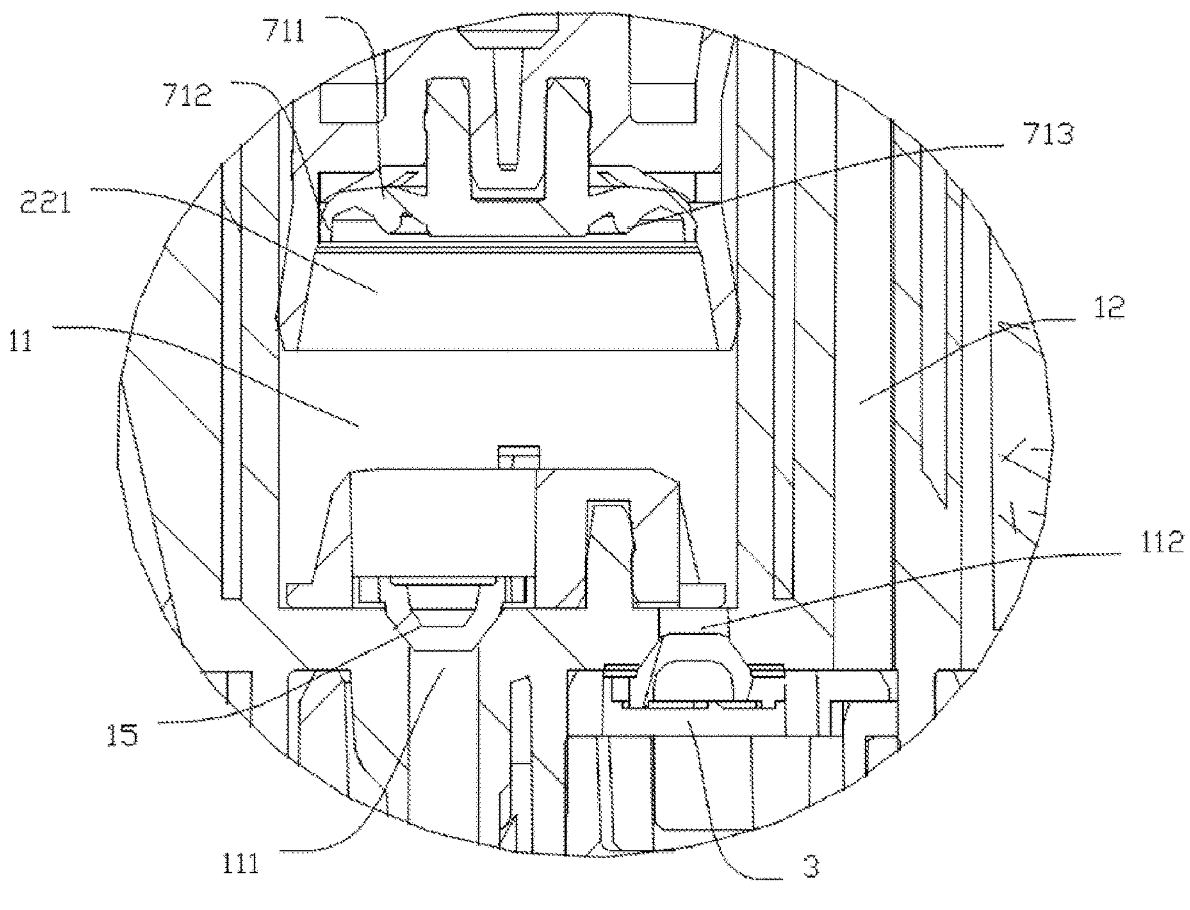
FIG. 3 is a partial enlarged view of part A in FIG. 2.

Referring to FIGS. 1-3, a liquid dispenser according to the present disclosure includes a pumping structure and a pressure-accumulation ejecting structure which cooperate for use, wherein the pumping structure includes a main frame 1, a liquid storage cavity 11 and a piston rod 2, wherein, referring to FIG. 3, the liquid storage cavity 11 is built into the main frame 1, and the lower end of the liquid storage cavity 11 is provided with a liquid inlet 111 and a liquid outlet 112 which can be opened and closed. The piston rod 2 can move upward and downward along the liquid storage cavity 11 under the action of a driving member, when the piston rod 2 moves downward, only the liquid outlet 112 is in an open state, and when the piston rod 2 moves upward, only the liquid inlet 111 is in an open state.

In the pumping structure, the liquid inlet 111 and the liquid outlet 112 are arranged at the lower end of the liquid storage cavity 11, so that the function of single-side liquid inlet and outlet of the liquid storage cavity 11 is realized; when the piston rod 2 moves downward, the volume of the liquid storage cavity 11 becomes smaller and the internal pressure increases, and at this time, gas or liquid in the liquid storage cavity 11 can be discharged from the liquid outlet 112 into the pressure-accumulation ejecting structure by opening the liquid outlet 112 and closing the liquid inlet 111; when the piston rod 2 moves upward, the volume of the liquid storage cavity 11 becomes larger and the internal pressure decreases, and at this time, liquid in a liquid storage bottle (not shown in the figure) can enter the liquid storage cavity 11 from the liquid inlet 111 by opening the liquid inlet 111 and closing the liquid outlet 112, so as to realize pumping of the liquid in the liquid storage bottle. It should be noted that in practical application, the liquid storage bottle is fixedly connected to the lower end of the main frame 1.

In some embodiments, referring to FIG. 3, the main frame 1 is provided with a diversion channel 12 and a guiding portion, the diversion channel 12 is located on one side of the liquid storage cavity 11, one end of the diversion channel 12 communicates with the pressure-accumulation ejecting structure, and the other end of the diversion channel 12 communicates with the guiding portion; the guiding portion is located below the liquid storage cavity 11 and includes a liquid inlet channel for enabling the liquid storage bottle to communicate with the liquid inlet 111, and a liquid outlet chamber 3 for enabling the liquid outlet 112 to communicate with the diversion channel 12.

When the piston rod 2 moves downward, the liquid outlet 112 is opened and the liquid inlet 111 is closed, at this time, as the volume of the liquid storage cavity 11 becomes smaller and the internal pressure increases, liquid in the liquid storage cavity 11 can enter the liquid outlet chamber 3 from the liquid outlet 112 and enter the pressure-accumulation ejecting structure via the diversion channel 12; when the piston rod 2 moves upward, the liquid outlet 112 is closed and the liquid inlet 111 is opened, at this time, as the volume of the liquid storage cavity 11 becomes larger and the internal pressure becomes smaller, liquid in the liquid storage bottle is sucked into the liquid storage cavity 11, and at the same time, the liquid entering the pressure-accumulation ejecting structure via the diversion channel 12 is ejected. The guiding portion located below the liquid storage cavity 11 is arranged on the main frame 1, and the liquid inlet channel is arranged on the guiding portion, thereby realizing the communication of the liquid storage bottle with the liquid inlet 111; further, the diversion channel 12 is directly formed on the main frame 1 and cooperates with the liquid outlet chamber 3 on the guiding portion, thereby realizing the communication of the liquid outlet 112 with the pressure-accumulation ejecting structure, and then realizing the liquid outlet function.

Specifically, referring to FIGS. 1-4, the guiding portion includes a suction pipe 41 and a fixing seat 42, wherein the fixing seat 42 is snap-fitted into the main frame 1 and is provided with a liquid outlet chamber 3; the suction pipe 41 is arranged at the lower end of the fixing seat 42, and one end of the suction pipe 41 extends into the liquid storage bottle; the fixing seat 42 is provided with a guiding branch pipe 43, and two ends of the guiding branch pipe 43 communicate with the suction pipe 41 and the liquid inlet 111, respectively; the suction pipe 41 and the guiding branch pipe 43 internally together form the liquid inlet channel.

The liquid in the liquid storage bottle can directly enter the liquid inlet 111 via the suction pipe 41 and the guiding branch pipe 43, and the liquid at the liquid outlet 112 can directly flow into the liquid outlet chamber 3. The guiding branch pipe 43 is arranged such that during liquid inlet, the liquid directly enters the liquid inlet 111 via the liquid inlet channel instead of entering the liquid outlet chamber 3; during liquid outlet, the liquid enters directly into the liquid outlet chamber 3 from the liquid outlet 112.

Figure 4:
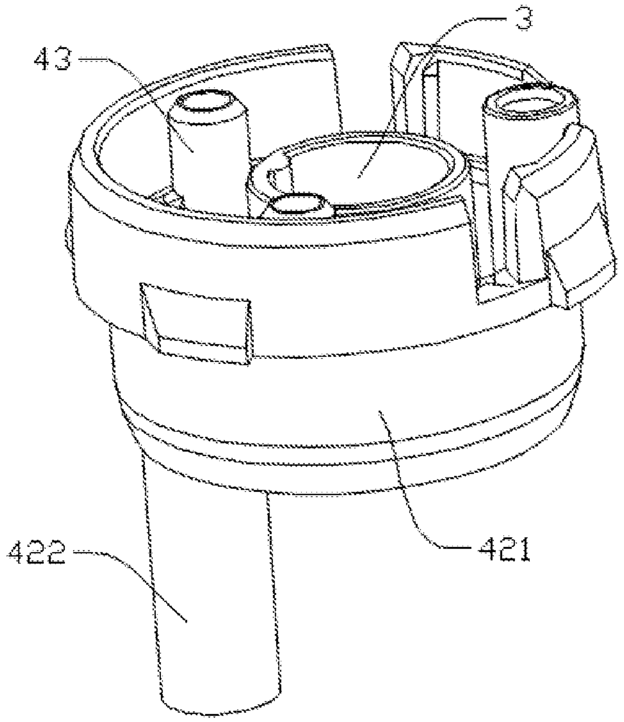
FIG. 4 is a schematic diagram of a three-dimensional structure of a fixing seat according to an embodiment of the present disclosure.

In some embodiments, referring to FIG. 4, the fixing seat 42 includes a seat body 421, wherein the upper end of the seat body 421 is provided with the liquid outlet chamber 3, the lower end of the seat body 421 is provided with an extension pipe 422 capable of sleeving the suction pipe 41, and the inner bottom wall of the liquid storage cavity 11 is provided with a guiding hole communicating with the extension pipe 422. During assembling, the suction pipe 41 can communicate with the guiding hole by inserting the suction pipe 41 into the extension pipe 422. Further, the mouth at the end of the extension pipe 422 facing the liquid storage bottle is set in a trumpet shape to facilitate smooth insertion of the suction pipe 41 into the extension pipe 422.

In some embodiments, in order to open and close the liquid inlet 111 and the liquid outlet 112, an inlet valve 13 is arranged on the side of the liquid inlet 111 facing the liquid storage cavity 11, and an outlet valve 14 is arranged on the side of the liquid outlet 112 facing the liquid outlet chamber 3. The blocking or unblocking of the liquid inlet 111 is achieved by the inlet valve 13, and the blocking or unblocking of the liquid outlet 112 is achieved by the outlet valve 14. In order to mount the inlet valve 13 and the outlet valve 14, in some embodiments, the inlet valve 13 may be fixed to the inner bottom wall of the liquid storage cavity 11 by snap-fitting, and the outlet valve 14 may be fixed to the outer bottom wall of the liquid storage cavity 11 by snap-fitting.

When the volume in the liquid storage cavity 11 becomes smaller, the internal pressure in the liquid storage cavity 11 increases, since the inlet valve 13 is located on the inner bottom wall of the liquid storage cavity 11 and the outlet valve 14 is located on the outer bottom wall of the liquid storage cavity 11, under the action of the internal pressure of the liquid storage cavity 11, the inlet valve 13 can deform downward to block the liquid inlet 111, and the outlet valve 14 deforms downward to open the liquid outlet 112; when the volume in the liquid storage cavity 11 becomes larger, the internal pressure in the liquid storage cavity 11 becomes smaller, the inlet valve 13 can deform upward to open the liquid inlet 111, and the outlet valve 14 can deform upward to block the liquid outlet 112.

Further, referring to FIG. 3, the inlet valve 13 and the outlet valve 14 each include an arc-shaped valve 15 which can be opened and closed unidirectionally. The blocking effect of the inlet valve 13 or the outlet valve 14 is further enhanced by the arrangement of the arc-shaped valve 15.

Figure 5:
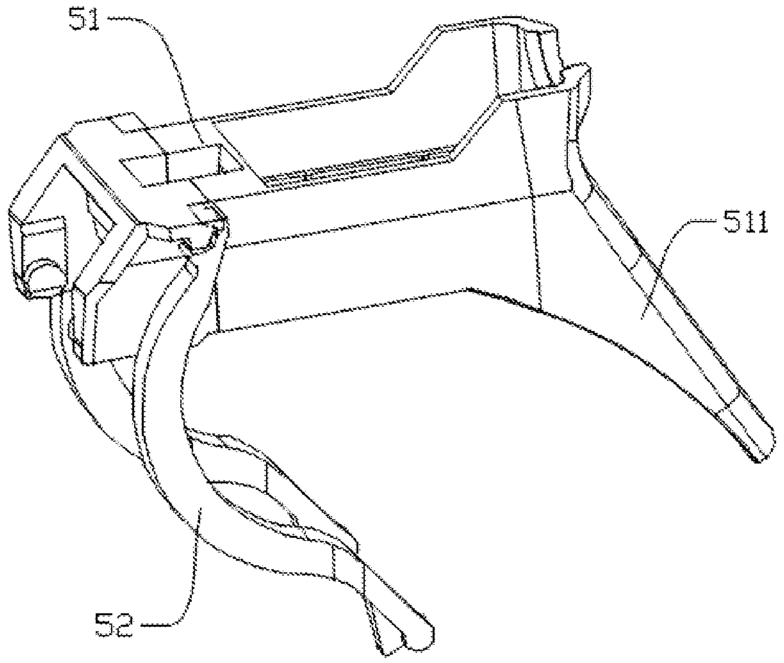
FIG. 5 is a structural schematic diagram of a trigger of a pumping structure according to an embodiment of the present disclosure.

In some embodiments, referring to FIGS. 2 and 5, the driving member includes a trigger 51 and a trigger spring 52, wherein the trigger 51 includes a casing detachably connected with the piston rod 2, one end of the casing is pivoted on the main frame 1, and the other end of the casing is provided with a pressing handle 511; one end of the trigger spring 52 abuts against the casing, and the other end of the trigger spring 52 abuts against the main frame 1.

When the pressing handle 511 is pressed downward, the casing can rotate downward around a position where the casing is pivoted with the main frame 1, thereby driving the piston rod 2 to move downward, and at this time, the trigger spring 52 is pressed downward and compressed; when the pressing handle 511 is released, the trigger spring 52 rebounds upward and stretches and drives the casing to rotate upward around a position where the casing is pivoted with the main frame 1, thereby driving the piston rod 2 to move upward.

In some embodiments, when the piston rod 2 moves upward and the liquid in the liquid storage bottle is pumped into the liquid storage cavity 11, the internal pressure in the liquid storage bottle will decrease due to the decrease of the liquid, and in order to avoid the phenomenon that the liquid storage bottle shrinks due to the decrease of the internal pressure, in the actual design, a pressure stabilizing channel 16 is formed on the main frame 1, and two ends of the pressure stabilizing channel 16 are respectively connected to the atmosphere and the liquid storage bottle. Moreover, the port of the pressure stabilizing channel 16 communicating with the atmosphere should be arranged above the dynamic sealing connection position between the piston rod 2 and the liquid storage cavity 11, so as to ensure that the pressure stabilizing channel 16 does not communicate with the liquid storage cavity 11 during the upward and downward movement of the piston rod 2, thereby ensuring the sealing property of the liquid storage cavity 11.

Figure 6:
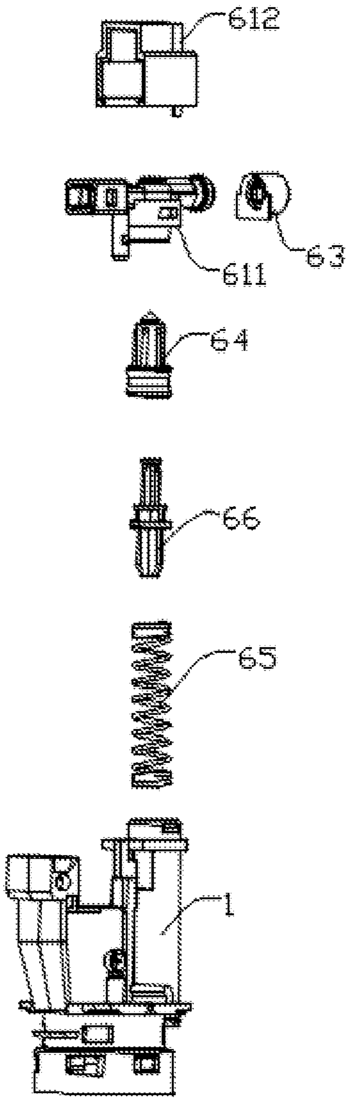
FIG. 6 is an exploded view of a pressure-accumulation ejecting structure of a liquid dispenser according to an embodiment of the present disclosure.
Figure 7:
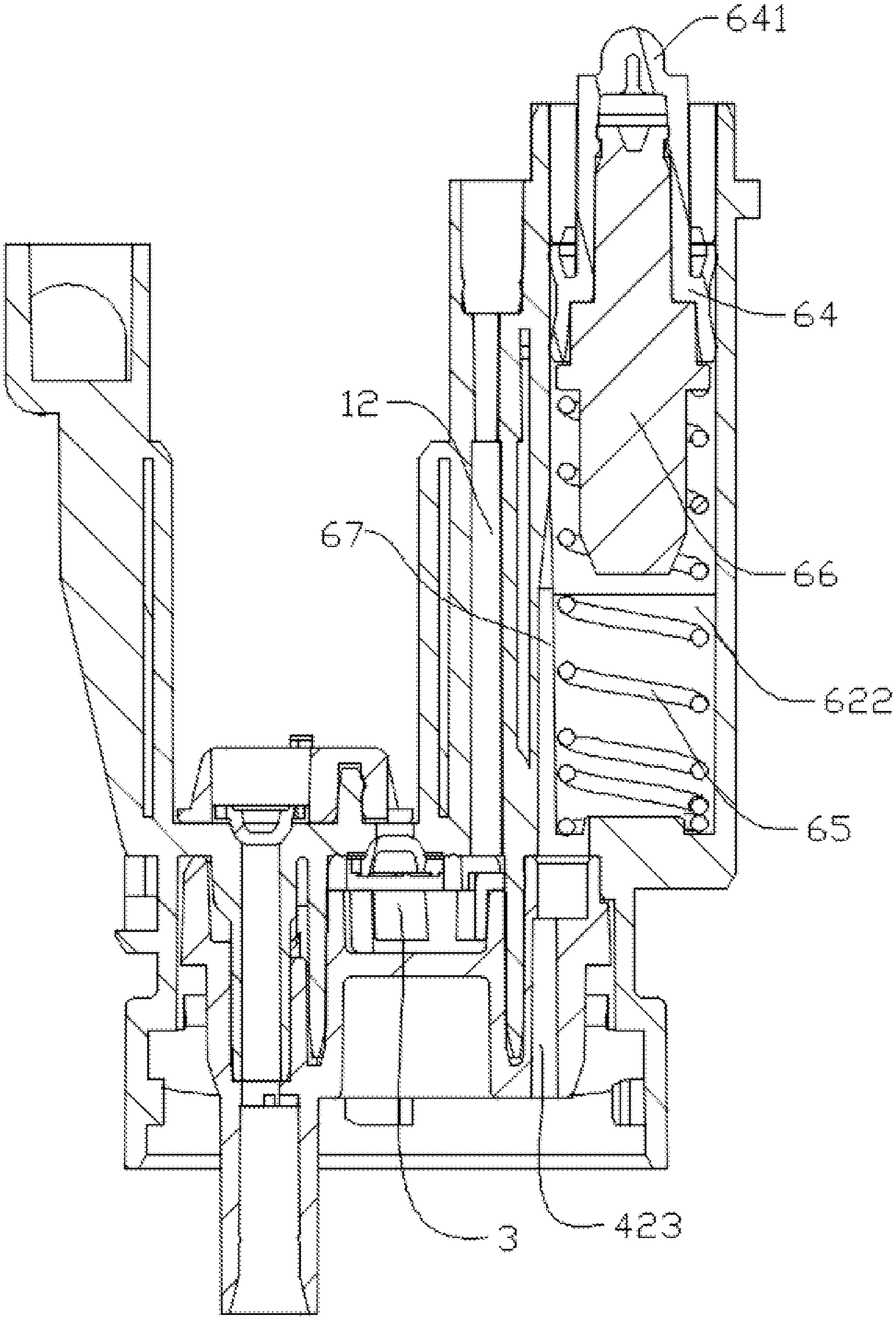
FIG. 7 is a cross-sectional view of a pressure accumulation cavity located in a main frame according to an embodiment of the present disclosure.
Figure 8:
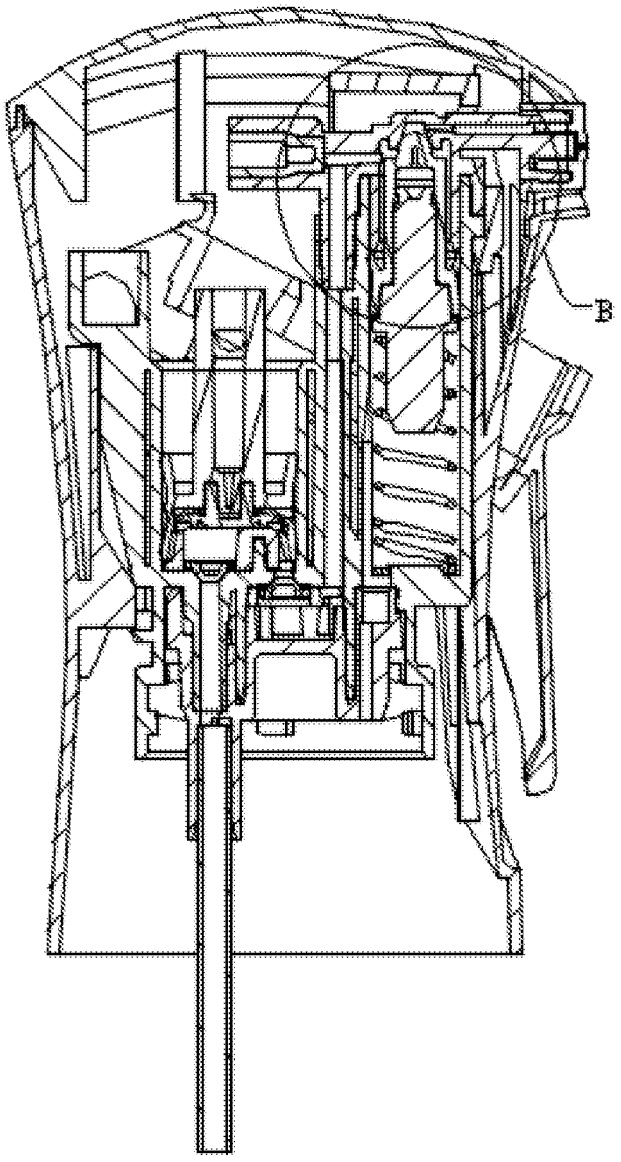
FIG. 8 is a schematic cross-sectional view of a liquid dispenser according to an embodiment of the present disclosure when a trigger is pressed.

In some embodiments, referring to FIGS. 6-8, the pressure-accumulation ejecting structure includes a top cover 61, a pressure accumulation cavity and a nozzle 63, wherein the pressure accumulation cavity is formed on the main frame 1 and is internally provided with a pressure accumulation portion for pressurizing the liquid; the top cover 61 is located above the pressure accumulation cavity and is internally provided with a top cover inner cavity.

Figure 9:
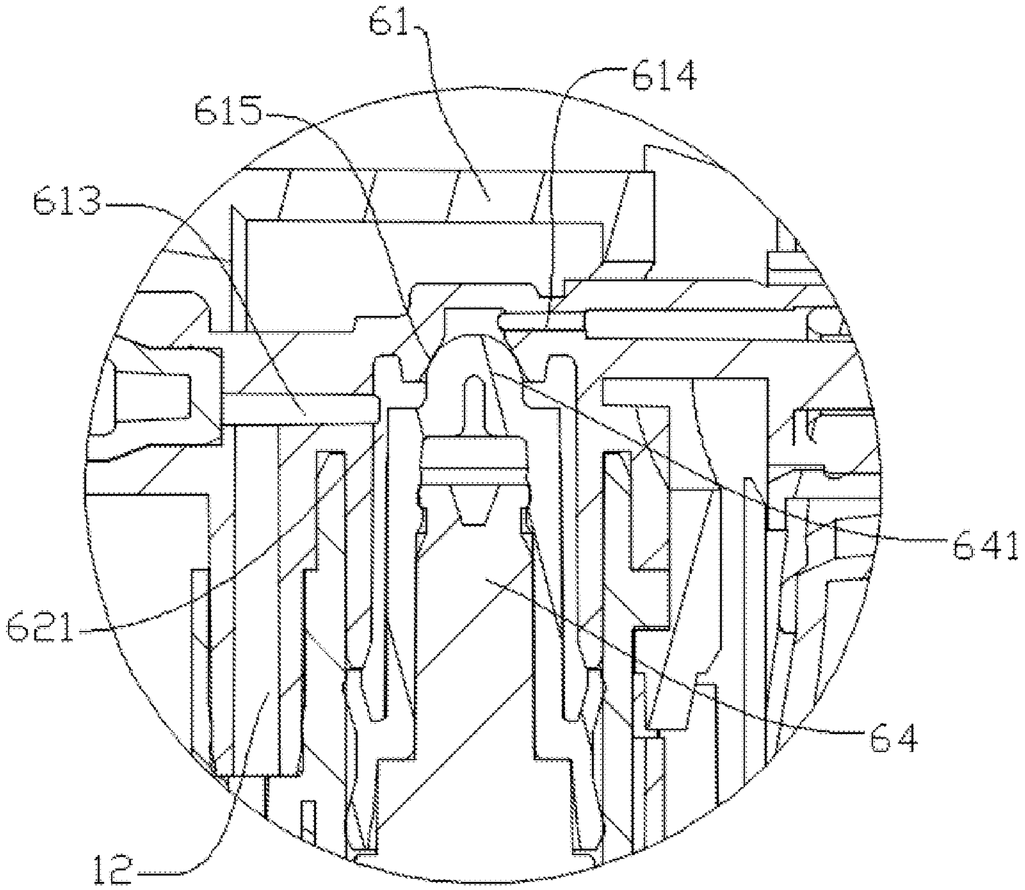
FIG. 9 is a partial enlarged view of part B in FIG. 8.

Specifically, referring to FIGS. 7 and 9, the pressure accumulation portion includes an inner plug 64 that is built into the pressure accumulation cavity and divides the pressure accumulation cavity into an upper cavity 621 and a lower cavity 622, and the upper cavity 621 communicates with the top cover inner cavity; the lower cavity 622 is internally provided with a pressure accumulation spring 65 and an ejector rod 66, one end of the pressure accumulation spring 65 abuts against the bottom of the pressure accumulation cavity, and the other end of the pressure accumulation spring 65 abuts against the ejector rod 66; the upper end part of the ejector rod 66 is sleeved with the inner plug 64 which is in dynamic sealing connection with the side wall of the pressure accumulation cavity. Exemplarily, the side wall of the inner plug 64 is of a stepped structure, the side wall of the lower end part of the inner plug 64 is in dynamic sealing connection with the pressure accumulation cavity, and a gap is reserved between the side wall of the upper end part of the inner plug 64 and the pressure accumulation cavity. When the pressure accumulation spring 65 is in a natural state, the upper end part of the inner plug 64 can extend into top cover inner cavity and seal the top cover inner cavity. At this time, the inner plug 64 may be used as a valve for closing the nozzle 63.

When the liquid enters the pressure-accumulation ejecting structure from the diversion channel 12, the liquid can exert pressure on the inner plug 64, the inner plug 64 is forced by the pressure of the liquid to move downward, and drives the ejector rod 66 to move downward and the pressure accumulation spring 65 to be compressed; at this time, due to the downward movement of the inner plug 64, the top cover inner cavity is opened, and part of the liquid can enter the nozzle 63 via the top cover inner cavity to be ejected, and part of the liquid flows into the upper cavity 621 with the downward movement of the inner plug 64; when the liquid outlet 112 is closed, the pressure accumulation spring 65 rebounds, and the ejector rod 66 moves upward and drives the inner plug 64 to move upward, thereby reversely pressurizing the liquid so that the liquid is ejected through the nozzle 63 until the inner plug 64 moves upward and seals the top cover inner cavity.

In some embodiments, referring to FIG. 7, the side wall of the pressure accumulation cavity is also provided with a pressure relief groove 67, and when the lower end part of the inner plug 64 moves to a position below the pressure relief groove 67, the pressure relief groove 67 can communicate with the pressure accumulation cavity due to the gap reserved between the upper end part of the inner plug 64 and the pressure accumulation cavity so as to achieve the purpose of pressure relief. Further, the fixing seat 42 is also provided with a backflow channel 423 for enabling the pressure relief groove 67 to communicate with the liquid storage bottle. When the lower end part of the inner plug 64 moves downward to a position below the pressure relief groove 67, the upper cavity 621 can communicate with the pressure relief groove 67, at this time, the liquid located in the upper cavity 621 can flow back into the liquid storage bottle via the pressure relief groove 67 and the backflow channel 423 to realize the pressure stabilization of the upper cavity 621.

In some embodiments, referring to FIGS. 6 and 9, the top cover 61 includes a top cover body 611 internally provided with a top cover inner cavity, and the top cover body 611 is covered with a cover shell 612. The top cover body 611 is directly buckled to the main frame 1 and is located above the pressure accumulation cavity 63. The top cover body 611 is also internally provided with an inner cavity liquid inlet channel 613 and an inner cavity liquid outlet channel 614 which are located on two sides of the top cover inner cavity, the inner cavity liquid inlet channel 613 is used to enable the diversion channel 12 to communicate with the top cover inner cavity, and the inner cavity liquid outlet channel 614 is used to enable the top cover inner cavity to communicate with the nozzle 63.

In some embodiments, referring to FIG. 9, the side wall of the top cover inner cavity is provided with a circular-truncated-cone-shaped sealing inclined plane 615, and the upper end of the inner plug 64 is provided with a hemispherical plug 641 that can be hermetically attached to the sealing inclined plane 615. The inner cavity liquid outlet channel 614 is arranged above the sealing inclined plane 615, the inner cavity liquid inlet channel 613 is arranged below the sealing inclined plane 615, so that when the hemispherical plug 641 is hermetically attached to the sealing inclined plane 615, the inner cavity liquid inlet channel 613 and the upper cavity 621 that are located below the sealing inclined plane 615 do not communicate with the inner cavity liquid outlet channel 614, thereby preventing outside gas from entering the upper cavity 621 and the inner cavity liquid inlet channel 613 from the inner cavity liquid outlet channel 614 in a non-use state, thereby preventing the risk that liquid remaining in the upper cavity 621, the inner cavity liquid inlet channel 613 (and the diversion channel 12) is oxidized.

Further, referring to FIG. 9, an inlet of the inner cavity liquid outlet channel 614 is arranged on the side wall of the top cover inner cavity, and the inlet of the inner cavity liquid outlet channel 614 is arranged close to the bottom of the top cover inner cavity, such that liquid in the top cover inner cavity can be discharged as much as possible when the inner plug 64 moves upward toward the bottom of the top cover inner cavity so as to reduce the amount of liquid remaining in the top cover inner cavity.

In some embodiments, the inner cavity liquid inlet channel 613 and the inner cavity liquid outlet channel 614 are both of a linear structure, and the inner cavity liquid inlet channel 613 and the inner cavity liquid outlet channel 614 are arranged in parallel. By setting the inner cavity liquid inlet channel 613 and the inner cavity liquid outlet channel 614 to be of the linear structures in parallel, the resistance of the inner cavity liquid inlet channel 613 and the inner cavity liquid outlet channel 614 to the liquid during ejection is reduced, thus making the ejection more labor-saving.

The pumping structure and the pressure-accumulation ejecting structure cooperate in the following manner:

referring to FIG. 8, in use, when the pressing handle 511 is pressed downward, the casing can rotate downward around a position where the casing is pivoted with the main frame 1, and then drives the piston rod 2 to move downward, the trigger spring 52 is pressed downward and compressed, the volume of the liquid storage cavity 11 becomes smaller and the internal pressure increases, under the action of pressure difference, the inlet valve 13 deforms downward to block the liquid inlet 111, while the outlet valve 14 deforms downward to open the liquid outlet 112, the liquid in the liquid storage cavity 11 then enters the liquid outlet chamber 3 along the liquid outlet 112 (it needs to be noted that the gas in the liquid storage cavity 11 can be discharged along the liquid outlet 112 if there is no liquid in the liquid storage cavity 11 upon initial pressing), when the liquid level in the liquid outlet chamber 3 rises to one end of the diversion channel 12, the liquid in the liquid outlet chamber 3 can enter the inner cavity liquid inlet channel 613 along the diversion channel 12, thereby exerting pressure on the inner plug 64 sealing the top cover inner cavity, the inner plug 64 then moves down, and the inner cavity liquid inlet channel 613 communicates with the top cover inner cavity, and the liquid floods into the upper cavity 621 along the top cover inner cavity; the liquid continuously exerts pressure on the inner plug 64, so that the inner plug 64 and the ejector rod 66 move downward, and the pressure accumulation spring 65 is compressed downward; at this time, due to the communication of the top cover inner cavity with the inner cavity liquid outlet channel 614, part of the liquid can enter the nozzle 63 to be ejected, and part of the liquid continues to flood into the upper cavity 621 with the downward movement of the inner plug 64; when the lower end part of the inner plug 64 moves downward to a position below the pressure relief groove 67, the pressure relief groove 67 communicates with the upper cavity 621 and performs pressure relief on the upper cavity 621, so that the liquid in the upper cavity 621 can flow back into the liquid storage bottle via the pressure relief groove 67 and the backflow channel 423 so as to realize the pressure stabilization of the upper cavity 621 and the top cover inner cavity;

referring to FIG. 2, when the pressing handle 511 is released, under the action of the rebound force of the trigger spring 52, the casing rotates upward around a position where the casing is pivoted with the main frame 1, and drives the piston rod 2 to move upward, the volume of the liquid storage cavity 11 becomes larger and the internal pressure decreases, and under the action of pressure difference, the inlet valve 13 deforms upward to open the liquid inlet 111, and the outlet valve 14 deforms upward to block the liquid outlet 112, at this time, the liquid in the liquid storage bottle is pumped into the liquid storage cavity 11 via the suction pipe 41, the guiding branch pipe 43 and the liquid inlet 111; at the same time, under the action of the rebound force of the pressure accumulation spring 65, the ejector rod 66 and the inner plug 64 move upward, the volume of the upper cavity 621 gradually decreases, the liquid in the upper cavity 621 and the top cover inner cavity enters the nozzle 63 under the action of pressurization, and is ejected, the inner plug 64 continues to move upward, the inner plug 64 passes by an outlet of the inner cavity liquid inlet channel 613, and then the inner plug 64 continues to move upward until the hemispherical plug 641 of the inner plug 64 and the sealing inclined plane 615 abut, so that the inner cavity liquid outlet channel 614 does not communicate with the upper cavity 621 and the inner cavity liquid inlet channel 613, and the nozzle 63 is closed;

When the pressing handle 511 is pressed in a state that the pressing handle 511 is not completely released, liquid, which has not been completely discharged last time, still remains in the top cover inner cavity and the upper cavity 621 of the pressure accumulation cavity, at this time, when the liquid in the liquid storage cavity 11 continuously floods into the top cover inner cavity via the diversion channel 12, part of the liquid is directly ejected from the nozzle 63, part of the liquid continuously floods into the upper cavity 621 of the pressure accumulation cavity, when the pressure exerted by the liquid on the inner plug 64 is greater than the rebound force of the pressure accumulation spring 65 to the inner plug 64, the pressure accumulation spring 65 is compressed again, the inner plug 64 and the ejector rod 66 move downward again; then, the pressing handle 511 is released again, the pressure accumulation spring 65 rebounds, and the liquid in the upper cavity 621 and the top cover inner cavity enters the nozzle 63 again and is ejected under the action of pressurization, and then the operation of releasing the pressing handle 511 and pressing the pressing handle 511 is continuously performed, so that continuous ejection of the liquid can be realized.

But in actual operation, when gas (during initial pressing) or a mixture of gas and liquid is inside the liquid storage cavity 11, during the downward movement of the piston rod 2, if the gas and liquid in the liquid storage cavity 11, the liquid outlet chamber 3, the diversion channel 12 and the inner cavity liquid inlet channel 613 are not enough to generate the pressure to push the inner plug 64 to move downward, the gas retained in the liquid storage cavity 11, the liquid outlet chamber 3, the diversion channel 12 and the inner cavity liquid inlet channel 613 is in a relatively sealed space, as the piston rod 2 continues to move downward, the volume of the liquid storage cavity 11 is continuously compressed, and this part of gas will be continuously formed into compressed gas, and the compressed gas will generate a counter-acting force on the piston rod 2, so that the downward movement of the piston rod 2 is hindered, and the gas in the liquid storage cavity 11 is difficult to exhaust.

Based on this, in some embodiments, the pumping structure further includes a pressure relief portion used to discharge compressed gas. Specifically, referring to FIG. 3 and FIGS. 11-13, the pressure relief portion includes an actuating member, a pressure relief valve 71 and a pressure relief channel 72, wherein the pressure relief valve 71 is arranged on the side of the piston rod 2 facing the liquid storage cavity 11 and enables the liquid storage cavity 11 to communicate with the pressure relief channel 72 under the action of the actuating member; the actuating member is arranged at the bottom of the liquid storage cavity 11, and can make contact with the pressure relief valve 71 and open the pressure relief valve 71 during the downward movement of the piston rod 2. The actuating member is arranged at the bottom of the liquid storage cavity 11, so that during downward movement of the piston rod 2, the actuating member can make contact with and open the pressure relief valve 71 to enable the liquid storage cavity 11 to communicate with the pressure relief channel 72, and the compressed gas in the liquid storage cavity 11 can be discharged through the pressure relief channel 72, thus ensuring the pumping efficiency of the piston rod 2.

Figure 13:
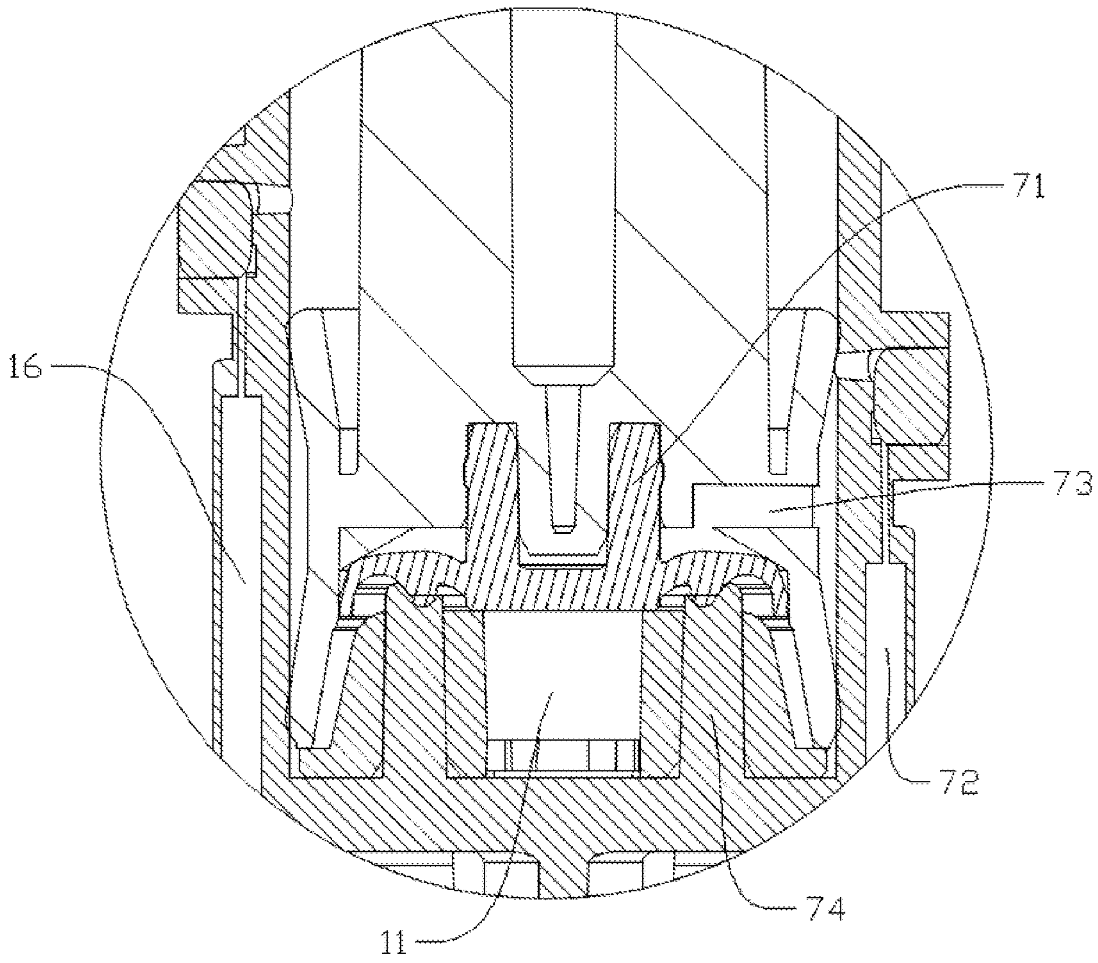
FIG. 13 is a schematic cross-sectional view of a pressure relief valve abutting against an annular boss during downward movement of a piston rod according to an embodiment of the present disclosure.

In some embodiments, referring to FIG. 13, a pressure relief hole 73 is formed in the piston rod 2, the pressure relief channel 72 is built into the main frame 1, and two ends of the pressure relief channel 72 communicate with the pressure relief hole 73 and the liquid storage bottle, respectively. The communication of the interior of the piston rod 2 with the pressure relief channel 72 is realized by the arrangement of the pressure relief hole 73, so that when the pressure relief valve 71 is opened, the compressed gas formed in the liquid storage cavity 11 can be discharged into the pressure relief channel 72 from the pressure relief hole 73, thereby releasing the compressed gas into atmospheric pressure gas.

It needs to be noted that, on the main frame 1, the port of the pressure relief channel 72 communicating with the piston rod 2 is set lower than the port of the pressure stabilizing channel 16 communicating with the atmosphere.

Figure 10:
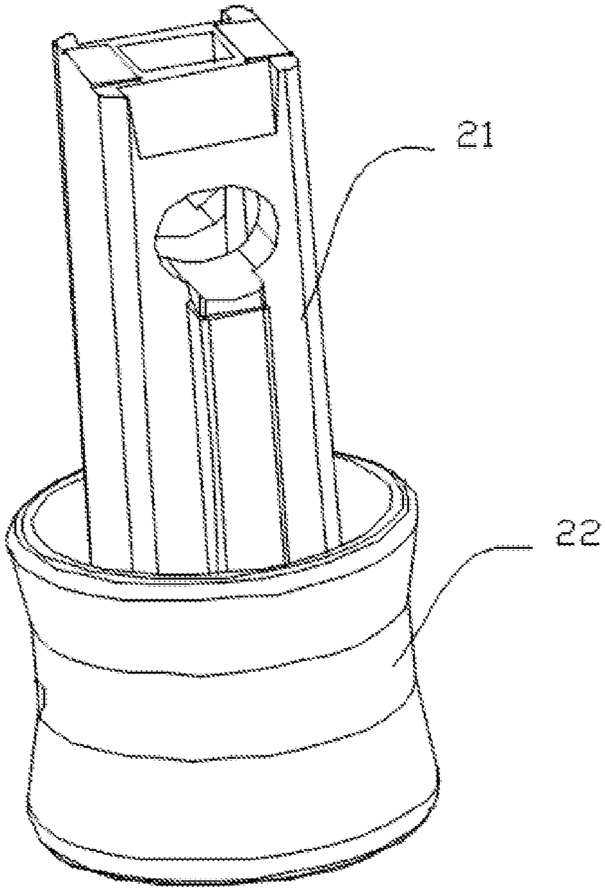
FIG. 10 is a schematic diagram of a three-dimensional structure of a piston rod according to an embodiment of the present disclosure.

In some embodiments, referring to FIGS. 3 and 10, the piston rod 2 includes a rod body 21, wherein the lower end of the rod body 21 is provided with a piston 22 which is in dynamic sealing connection to the inner side wall of the liquid storage cavity 11, and the piston 22 is provided with a piston accommodating groove 221 facing the bottom of the liquid storage cavity 11. The pressure relief valve 71 is located in the piston accommodating groove 221 and divides the piston accommodating groove 221 into an upper accommodating groove and a lower accommodating groove, wherein the upper accommodating groove communicates with the pressure relief hole 73. Since the upper accommodating groove communicates with the pressure relief hole 73 and the pressure relief channel 72, the interior of the upper accommodating groove is in an atmospheric pressure state; the lower accommodating groove is located below the pressure relief valve 71 and directly communicates with the liquid storage cavity 11, the interior of the lower accommodating groove can maintain the same air pressure state as the liquid storage cavity 11.

Figure 11:
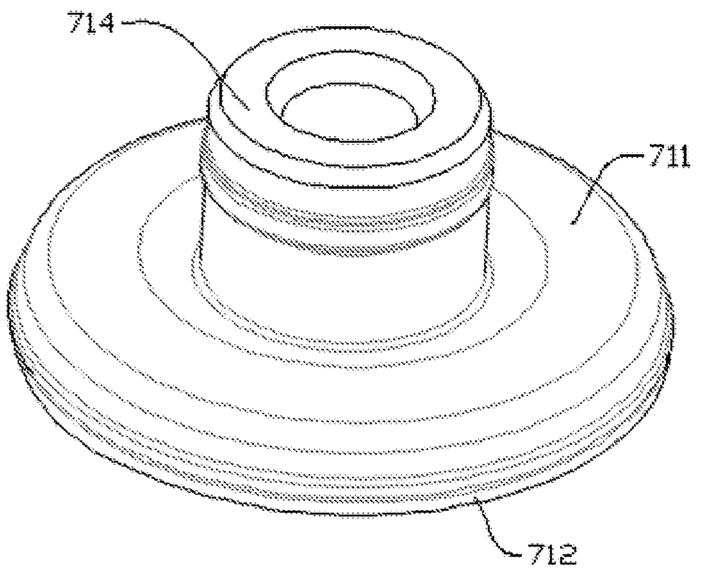
FIG. 11 is a schematic diagram of a three-dimensional structure of a pressure relief valve according to an embodiment of the present disclosure.
Figure 12:
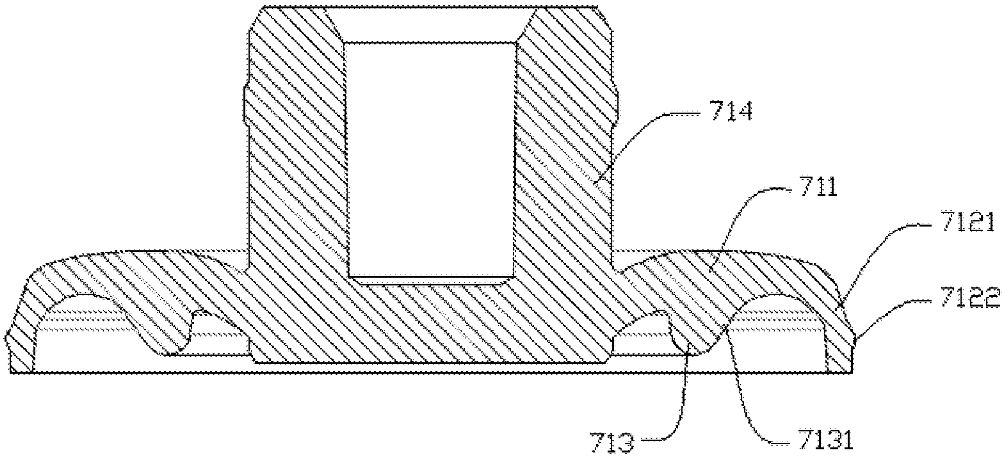
FIG. 12 is a schematic cross-sectional view of a pressure relief valve according to an embodiment of the present disclosure.

In some embodiments, referring to FIGS. 11-12, the pressure relief valve 71 includes a valve body 711, wherein the outer peripheral face of the valve body 711 is provided with a sealing lip 712 capable of hermetically abutting against an inner side wall of the piston accommodating groove 221. The lower end of the valve body 711 is provided with an abutment convex ring 713 for allowing the actuating member to make contact therewith, and the upper end of the valve body 711 is provided with a connecting rod 714 inserted into the rod body 21 by interference fit. When the connecting rod 714 of the pressure relief valve 71 is installed to the piston rod 2 by interference fit, the joint between the valve body 711 and the sealing lip 712 can abut against the inner wall of the upper accommodating groove, so that when the piston rod 2 moves downward, the joint between the valve body 711 and the sealing lip 712 can also be subjected to the downward pressure exerted by the piston rod 2.

First, the pressure relief valve 71 is fixedly connected to the piston rod 2 by means of the connecting rod 714, and then the sealing lip 712 is arranged on the outer peripheral face of the valve body 711, so that the annular sealing of the pressure relief valve 71 for the piston accommodating groove 221 is ensured; in addition, since the pressure relief valve 71 is arranged on the side of the piston rod 2 facing the liquid storage cavity 11, when the pressure relief valve 71 is not opened (that is, the sealing lip 712 hermetically abuts against the inner side wall of the piston accommodating groove 221), a seal for the top of the liquid storage cavity 11 can be jointly formed by the pressure relief valve 71 and the piston rod 2.

Referring to FIG. 12, the valve body 711 is of an umbrella-shaped structure or a circular structure, and the sealing lip 712 includes an annular piece 7121 extending downward along the outer peripheral face of the valve body 711, and an annular protrusion 7122 is arranged on the outer peripheral face of the annular piece 7121 to ensure the sealing effect of the sealing lip 712 for the inner side wall of the piston accommodating groove 221.

It needs to be noted that the valve body 711, the sealing lip 712, the abutment convex ring 713 and the connecting rod 714 may be of an integrated structure, wherein the valve body 711 and the sealing lip 712 need to be made of an elastic material.

In some embodiments, the actuating member includes an annular boss 74, wherein the lower end of the annular boss 74 is fixedly connected in the liquid storage cavity 11, and the upper end of the annular boss 74 faces the abutment convex ring 713.

When the piston rod 2 moves downward, the abutment convex ring 713 can abut against the annular boss 74; when the piston rod 2 continues to move downward, the valve body 711 generates arch-shaped deformation due to the abutment of the abutment convex ring 713 against the annular boss 74, that is, when the piston rod 2 moves downward, since the joint between the valve body 711 and the connecting rod 714 and the joint between the valve body 711 and the sealing lip 712 are both subjected to a downward acting force from the piston rod 2, at this time, due to the abutment of the abutment convex ring 713 against the annular boss 74, the valve body 711 can exhibit an arch shape (the junction between the valve body 711 and the abutment convex ring 713 is the apex of the arch shape, while the junction between the valve body 711 and the connecting rod 714 and the joint between the valve body 711 and the sealing lip 712 are two end points of the arch shape), at this time, due to the arch-shaped deformation of the valve body 711, the valve body 711 exhibits retracted deformation in the direction from the sealing lip 712 to the connecting rod 714, so that the transverse spacing (spacing in the horizontal direction shown in the figure) between the connecting rod 714 and the sealing lip 712 is reduced, thus, the sealing lip 712 and the inner side wall of the piston accommodating groove 221 form a gap therebetween and are no longer in hermetical abutment. At this time, the compressed gas in the liquid storage cavity 11 can enter the pressure relief hole 73 along the gap between the sealing lip 712 and the inner side wall of the piston accommodating groove 221 and then enter the pressure relief channel 72.

Further, in order to cooperate with the arch-shaped deformation of the valve body 711, the side of the abutment convex ring 713 facing the sealing lip 712 is a first inclined plane 7131 inclined downward in the direction from a position close to the sealing lip 712 to a position away from the sealing lip 712. The annular boss 74 is provided with a second inclined plane abutting against the first inclined plane 7131. During the downward movement of the piston rod 2, the movement of the abutment convex ring 713 is guided by the abutment of the first inclined plane 7131 against the second inclined plane.

Under the circumstances that there is gas in the liquid storage cavity 11, and when gas (or gas-liquid mixture) entering the pressure-accumulation ejecting structure by means of the pumping structure is not enough to drive the inner plug 64 to move downward during downward movement of the piston rod 2, the gas retained inside the liquid storage cavity 11, the liquid outlet chamber 3, the diversion channel 12, the inner cavity liquid inlet channel 613 is in a relatively sealed space, and as the piston rod 2 continuously moves downward, the volume of the liquid storage cavity 11 is continuously compressed, and the gas in the liquid storage cavity 11 is continuously formed into compressed gas; the piston rod 2 continues to move downward until the abutment boss 713 of the pressure relief valve 71 abuts against the annular boss 74, thereby forcing the pressure relief valve 71 to be opened, the compressed gas can enter the pressure relief hole 73 and the pressure relief channel 72 along the gap between the sealing lip 712 and the piston accommodating groove 221, and flow back into the liquid storage bottle along the pressure relief channel 72 so as to achieve the purpose of pressure relief.

In some embodiments, referring to FIGS. 2 and 8, the liquid dispenser further includes a top cap 8 and a housing 9, wherein the top cap 8 is connected to the housing 9 to form a cavity for accommodating the pumping structure and the pressure-accumulation ejecting structure.

The above embodiments are merely illustrative of the technical concepts and features of the present disclosure, and are intended to enable those skilled in the art to understand and implement the content of the present disclosure, and should not be construed as limiting the protection scope of the present disclosure. Equivalent variations and modifications made according to the spirit of the present disclosure are intended to be included within the protection scope of the present disclosure.

What is claimed is:

1. A liquid dispenser, comprising a pumping structure and a pressure-accumulation ejecting structure which cooperate for use, wherein the pumping structure comprises a main frame, a liquid storage cavity and a piston rod, wherein the liquid storage cavity is built into the main frame, and a lower end of the liquid storage cavity is provided with a liquid inlet and a liquid outlet which can be opened and closed; the piston rod can move upward and downward along the liquid storage cavity under an action of a driving member, when the piston rod moves downward, only the liquid outlet is in an open state, and when the piston rod moves upward, only the liquid inlet is in an open state;

the main frame is provided with a diversion channel and a guiding portion, the diversion channel is located at one side of the liquid storage cavity, one end of the diversion channel communicates with the pressure-accumulation ejecting structure, and the other end of the diversion channel communicates with the guiding portion; the guiding portion is located below the liquid storage cavity and comprises a liquid inlet channel configured to enable a liquid storage bottle to communicate with the liquid inlet, and a liquid outlet chamber configured to enable the liquid outlet to communicate with the diversion channel.

2. The liquid dispenser according to claim 1, wherein the guiding portion comprises a suction pipe and a fixing seat which cooperate for use, wherein the fixing seat is snap-fitted into the main frame, and is provided with the liquid outlet chamber; the suction pipe is arranged at a lower end of the fixing seat, and one end of the suction pipe extends into the liquid storage bottle; the fixing seat is provided with a guiding branch pipe, and two ends of the guiding branch pipe communicate with the suction pipe and the liquid inlet, respectively; the suction pipe and the guiding branch pipe internally together form the liquid inlet channel.

3. The liquid dispenser according to claim 2, wherein the fixing seat comprises a seat body, wherein an upper end of the seat body is provided with the liquid outlet chamber, a lower end of the seat body is provided with an extension pipe capable of sleeving the suction pipe, and an inner bottom wall of the liquid storage cavity is provided with a guiding hole communicating with the extension pipe.

4. The liquid dispenser according to claim 3, wherein a mouth at an end of the extension pipe facing the liquid storage bottle is set in a trumpet shape.

5. The liquid dispenser according to claim 1, wherein an inlet valve is arranged at the liquid inlet, and an outlet valve is arranged at the liquid outlet; the inlet valve and the outlet valve each comprise an arc-shaped valve which can be opened and closed unidirectionally.

6. The liquid dispenser according to claim 1, wherein the driving member comprises a trigger and a trigger spring, wherein the trigger comprises a casing detachably connected with the piston rod, one end of the casing is pivoted on the main frame, and the other end of the casing is provided with a pressing handle; one end of the trigger spring abuts against the casing, and the other end of the trigger spring abuts against the main frame.

7. The liquid dispenser according to claim 1, wherein the pressure-accumulation ejecting structure comprises a top cover, a pressure accumulation cavity and a nozzle, wherein the pressure accumulation cavity is formed on the main frame and is internally provided with a pressure accumulation portion for pressurizing liquid; the top cover is located above the pressure accumulation cavity and is internally provided with a top cover inner cavity capable of communicating with the diversion channel, the pressure accumulation cavity and the nozzle.

8. The liquid dispenser according to claim 7, wherein the pressure accumulation portion comprises an inner plug that is built into the pressure accumulation cavity and divides the pressure accumulation cavity into an upper cavity and a lower cavity, and the upper cavity communicates with the top cover inner cavity; the lower cavity is internally provided with a pressure accumulation spring and an ejector rod, and one end of the pressure accumulation spring abuts against a bottom of the pressure accumulation cavity, and the other end of the pressure accumulation spring abuts against the ejector rod; an upper end part of the ejector rod is sleeved with the inner plug which is in dynamic sealing connection with a side wall of the pressure accumulation cavity.

9. The liquid dispenser according to claim 8, wherein a side wall of the top cover inner cavity is provided with a sealing inclined plane, and an upper end of the inner plug is provided with a hemispherical plug that can be hermetically attached to the sealing inclined plane; the top cover is further internally provided with an inner cavity liquid inlet channel and an inner cavity liquid outlet channel located at two sides of the top cover inner cavity; the inner cavity liquid inlet channel is located below the sealing inclined plane so as to enable the diversion channel to communicate with the top cover inner cavity; the inner cavity liquid outlet channel is located above the sealing inclined plane so as to enable the top cover inner cavity to communicate with the nozzle.

10. The liquid dispenser according to claim 9, wherein the inner cavity liquid inlet channel and the inner cavity liquid outlet channel are both of a linear structure, and the inner cavity liquid inlet channel and the inner cavity liquid outlet channel are arranged in parallel.

11. The liquid dispenser according to claim 9, wherein an inlet of the inner cavity liquid outlet channel is arranged on the side wall of the top cover inner cavity, and the inlet of the inner cavity liquid outlet channel is arranged close to the bottom of the top cover inner cavity.

12. The liquid dispenser according to claim 9, wherein a side wall of the pressure accumulation cavity is provided with a pressure relief groove, and the fixing seat is provided with a backflow channel configured to enable the pressure relief groove to communicate with the liquid storage bottle; when a lower end part of the inner plug moves to a position below the pressure relief groove, the liquid in the upper cavity can flow back into the liquid storage bottle via the pressure relief groove and the backflow channel.

13. The liquid dispenser according to claim 1, wherein the pumping structure further comprises a pressure relief portion, wherein the pressure relief portion comprises an actuating member, a pressure relief valve and a pressure relief channel, the pressure relief valve is arranged on a side of the piston rod facing the liquid storage cavity and can enable the liquid storage cavity to communicate with the pressure relief channel under the action of the actuating member; the actuating member is arranged at a bottom of the liquid storage cavity and can make contact with the pressure relief valve and open the pressure relief valve during downward movement of the piston rod.

14. The liquid dispenser according to claim 13, wherein the pressure relief valve comprises a valve body, wherein an outer peripheral face of the valve body is provided with a sealing lip capable of hermetically abutting against the piston rod, and a lower end of the valve body is provided with an abutment convex ring with which the actuating member can make contact.

15. The liquid dispenser according to claim 14, wherein the piston rod is provided with a pressure relief hole located above the sealing lip, the pressure relief channel is built into the main frame, and two ends of the pressure relief channel communicate with the pressure relief hole and the liquid storage bottle, respectively.

16. The liquid dispenser according to claim 15, wherein the piston rod comprises a rod body, wherein a lower end of the rod body is provided with a piston which is in dynamic sealing connection with the liquid storage cavity, the piston is provided with a piston accommodating groove facing a bottom of the liquid storage cavity; the pressure relief valve is located in the piston accommodating groove and divides the piston accommodating groove into an upper accommodating groove and a lower accommodating groove, and the upper accommodating groove communicates with the pressure relief hole.

17. The liquid dispenser according to claim 16, wherein when the piston rod moves downward, a junction between the valve body and the sealing lip can abut against an inner wall of the upper accommodating groove.

18. The liquid dispenser according to claim 14, wherein an upper end of the valve body is provided with a connecting rod inserted into the rod body by interference fit.

19. The liquid dispenser according to claim 14, wherein the actuating member comprises an annular boss, wherein a lower end of the annular boss is fixedly connected in the liquid storage cavity, and an upper end of the annular boss faces the abutment convex ring; when the piston rod moves downward, the abutment convex ring can abut against the annular boss, so that the sealing lip is tilted upward to not hermetically abut against the piston rod.

20. The liquid dispenser according to claim 19, wherein the abutment convex ring is of a ring-like structure, and a side of the abutment convex ring facing the sealing lip is a first inclined plane inclined downward in a direction from a position close to the sealing lip to a position away from the sealing lip; the annular boss is provided with a second inclined plane abutting against the first inclined plane.

* * * * *